Sept. 15, 1931.    A. F. O'CONNOR    1,823,570
HAND BRAKE
Filed May 26, 1928    2 Sheets-Sheet 1
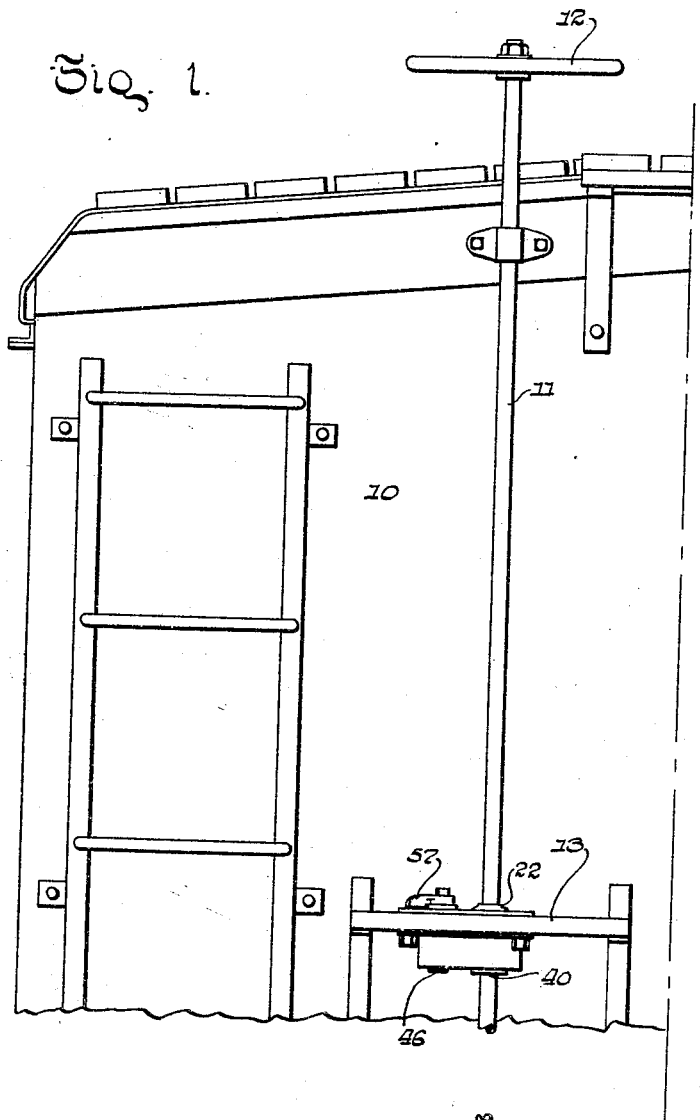
Fig. 1.
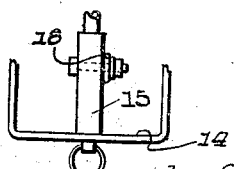
Witness
William P. Kilroy
Inventor
Arthur F. O'Connor
By Samuel W. Banning
Attys.

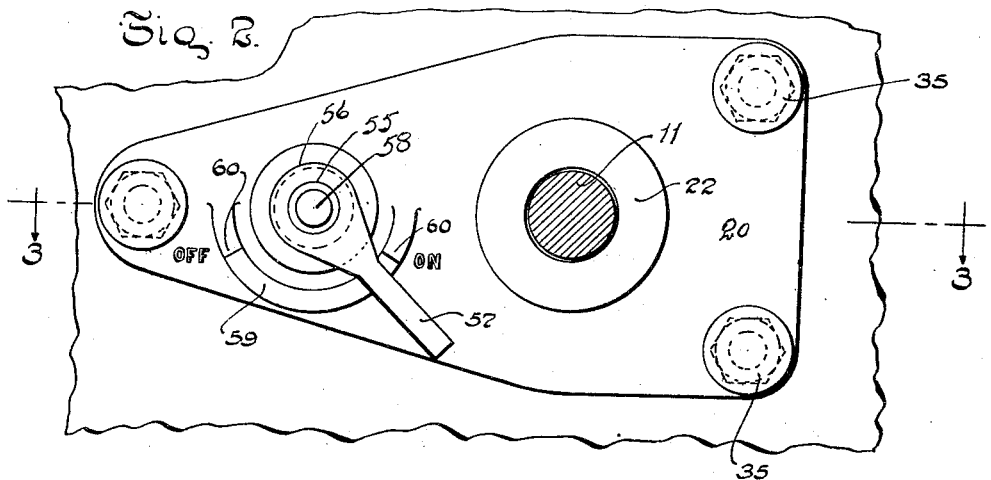
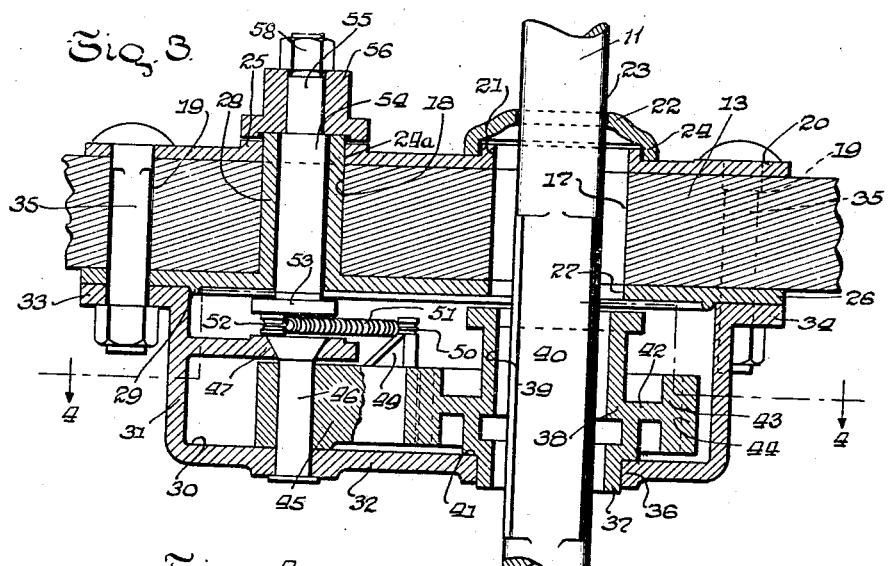
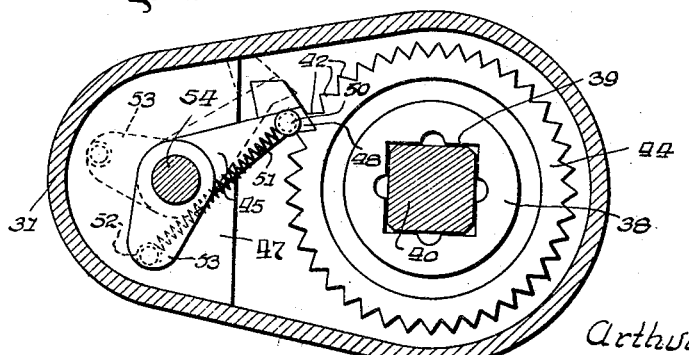

Patented Sept. 15, 1931

1,823,570

UNITED STATES PATENT OFFICE

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS

HAND BRAKE

Application filed May 26, 1928. Serial No. 280,665.

This invention relates to improvements in hand brakes.

One of the objects of the invention is to provide a pawl and ratchet mechanism which is mounted upon the brake step of the car in such manner that the operating parts of the mechanism are substantially entirely enclosed and protected from the weather.

Another object of the invention is to provide a pawl and ratchet mechanism wherein the pawl is yieldably held in engaged or disengaged position with reference to the ratchet wheel, together with operating means adapted to shift the pawl from one position to the other, and simultaneously automatically shift the yieldable means to the corresponding operating position.

Other and further objects of the invention will more clearly appear from the description and claims hereinafter following.

Referring to the drawings forming a part of this specification:

Figure 1 is a fragmentary elevational view of the end of a railway car, having a hand brake mounted thereon, and showing the invention applied in position;

Fig. 2 is an enlarged fragmentary plan view of the brake step of the car, showing a top plane view of the invention, the brake mast being shown in section;

Fig. 3 is a vertical sectional view of the invention, corresponding substantially to the line 3—3 of Fig. 2; and Fig. 4 is a horizontal sectional view of the invention, corresponding to the line 4—4 of Fig. 3.

As shown in the drawings, 10 represents the end wall of the railway car, upon which a brake mast 11 is mounted in the usual manner, said mast having affixed to its upper end a hand wheel 12. The mast extends downwardly through the brake step 13 and has its lower end rotatably mounted in the usual stirrup 14. Above the stirrup the brake is provided with a drum 15, and to the drum is connected a brake chain 16 leading to the brake rod, which in turn is connected to the mechanism which operates the brake shoes proper.

The brake step 13 is provided with an aperture 17, preferably of considerably greater diameter than the diameter of the mast 11. The brake step also has an aperture 18 disposed to one side of and in line with the aperture 17. The step is further provided with a plurality of apertures 19—19 for the reception of securing bolts as hereinafter described.

Secured to the upper surface of the brake step is a plate 20 provided with an upstanding boss 21 which defines an opening adapted to register with the aperture 17 when the plate is in position. A protecting cap 22 is provided, having an aperture 23 therein of slightly greater diameter than the mast 11, said cap being provided with a flange 24 adapted to fit over the boss 21 and rest upon the body portion of the plate 20. The plate 20 also is provided with an aperture 24a coinciding in position with the aperture 18 in the step, and the opening is surrounded by an upstanding rib 25.

A second plate is provided for the under surface of the brake step 13, and is indicated by the reference character 26. The plate 26 has an aperture 27 which registers with the aperture 17 in the step. The plate 26 is also provided with an integrally formed upstanding sleeve 28 which fits within the aperture 18 in the step, and within the aperture 24a in the plate 20, as best shown in Fig. 3, the sleeve 28 projecting somewhat above the annular rib 25 when the parts are in position.

The plate 26 also is provided with a rib 29 which co-operates with a housing member 30 to provide a tight closure. The housing member 30 includes a vertically extending continuous wall 31, the edge of which merges into a horizontally extending wall 32. The wall 31 is provided with a laterally projecting flange 33 and projecting flanges 34 which rest flat against the marginal portions of the plate 26 outside of the rib 29.

Securing bolts 35 are extended through the marginal portions of the plate 20, the plate 26, and the flanges 33 and 34, which clamp the parts rigidly in position. The horizontal wall 32 of the housing member 30 is provided with a bearing 36 in which is journalled an annular portion 37 of a ratchet wheel 38, the ratchet wheel being provided with a sleeve-like portion 39 polygonal in cross section and adapted to fit upon the polygonal portion 40 of the brake mast 11, the ratchet wheel above the annular portion 37 being provided with a shoulder 41 adapted to bear upon the upper surface of the wall 32. The sleeve 39 has a radially extending web 42, which is enlarged, as indicated at 43, to provide a relatively wide annular portion upon which the ratchet teeth 44 are formed.

The pawl 45 is pivotally mounted upon a pin 46 having a bearing in the wall 32 at one end, and at its opposite end having a bearing in a partition 47 formed on the side wall 31 and spaced a considerable distance from the plate 26 when the parts are in position. The pawl 45 is freely swingable and has a tooth 48 adapted to engage the teeth 44 of the ratchet wheel.

Upon the upper surface of the pawl, adjacent the tooth 48, is formed a lug 49, having a reduced portion 50 to which one end of the coil spring 51 is connected. The opposite end of the coil spring is connected to a lug 52, formed at the end of an arm or crank 53, forming part of an element 54 which is rotatably mounted in the sleeve 28 of the plate 26, the rotatable element 54 being provided with a reduced polygonal bearing portion 55 upon which is mounted one end of a lever 57, the reduced portion 55 being still further reduced and threaded for the reception of a nut 58. The lever 57 provides a toe piece by means of which the brakeman may rotate the element 54 in the desired direction to engage or disengage the pawl 45. The plate 20 has a quadrant 59 upon which the free end portion of the lever 57 may ride, said quadrant being provided with stops 60—60, to limit the movement of the lever 57 in opposite directions.

In operation, assuming the pawl 45 to be in the position shown in Fig. 4, and it is desired to set the brake, the hand wheel 12 is rotated in a clockwise direction, to wind the chain on the drum, corresponding movement being imparted to the ratchet wheel 38. During this action, the pawl 45 is resiliently or yieldably held in engagement with the teeth 44 of the ratchet wheel 38 by means of the coiled spring 51, which exerts a tension upon the toothed portion of the pawl toward the lug 52 which is disposed at one side of the axis of the pin 46 upon which the pawl 45 is mounted.

When it is desired to reduce the brake, the lever 57 is moved by the foot of the brakeman in a clockwise direction, causing corresponding movement of the rotatable element 54 and the crank 53, whereby the lug 52 is disposed at the opposite side of the axis of the pin 46.

When the brake is taken up slightly to release the tooth 48, the pawl is immediately moved in a counter-clockwise direction out of engagement with the teeth of the ratchet wheel under the influence of the coil spring 51, and held, in disengaged position until the lever 57 is swung in the opposite direction, whereupon the lug 52 is disposed again at the opposite side of the axis of the pin 46, causing the spring to pull the pawl into engagement with the teeth of the ratchet wheel.

Due to the application of the major portion of the operating parts of the ratchet device beneath the brake step, together with the protecting housing which cooperates with the top plate 20 in a novel manner, a substantially weatherproof arrangement is provided, thereby obviating many difficulties arising from exposure of the operating parts to the weather. The ratchet mechanism proper is of extremely simple form and has a marked advantage in that the pawl is yieldably held either in engaged or disengaged position by the single yieldable means, which are automatically and simultaneously shiftable to the required position by reason of the movement imparted to the operating means to shift the pawl.

While I have herein shown and described what I consider the preferred manner of carrying out the invention, the same is merely illustrative, and I contemplate all changes and modifications which come within the scope of the claims appended hereto.

I claim:

1. In a hand brake mechanism of the character described, the combination with a rotatable ratchet element; of a pivoted pawl; and mechanism for shifting said pawl from operative to inoperative position, said mechanism including yieldable means for urging said pawl in one direction or the other, depending upon its position, and a shiftable operating element for shifting the position of said pawl, said element being operatively connected to said yieldable means whereby movements of said element are transmitted through said yieldable means to said pawl.

2. In a hand brake of the character described, the combination with a rotatable element and a ratchet wheel secured thereto; of a pivoted pawl having an operative end portion engageable and disengageable with reference to said ratchet element; shiftable operating means movable to opposite sides of the pivotal point of said pawl; and yieldable means connected with said operating means and with the operative end portion of said pawl, whereby the pawl is shifted by movement of said operating means directly transmitted through said yieldable means to said pawl, said pawl being urged by said yieldable means in a direction toward or from said ratchet element, depending upon the position to which it is shifted.

3. In a hand brake mechanism of the character described, the combination with a rotatable member provided with a ratchet wheel thereon; of a pawl pivoted adjacent one end and adapted to have its forward end moved into and out of engagement with reference to the ratchet element; a shiftable element disposed in the rear of the rear end of said pawl and movable to opposite sides of the pivotal point of said pawl; and a tension spring connected to the forward end of said pawl and to said shiftable member.

4. In a hand brake mechanism of the character described, the combination with a brake step of a railway car; of a housing secured beneath said brake step and arranged to provide a compartment; a brake staff extending through said step and housing; a ratchet wheel mounted upon said staff within said compartment; a pivoted pawl engageable and disengageable with reference to said ratchet element; operating means mounted in said compartment and having an operating member extending to the upper side of said step, said operating means being shiftable to one side or the other of the pivotal point of said pawl; and a spring extending to and connected with a portion of said pawl in advance of the pivotal point thereof.

In witness that I claim the foregoing I have hereunto subscribed my name this 16th day of May, 1928.

ARTHUR F. O'CONNOR.